United States Patent [19]
Kitahara

[11] Patent Number: 5,821,515
[45] Date of Patent: Oct. 13, 1998

[54] INFORMATION RECORDING AND REPRODUCING APPARATUS

[75] Inventor: Toshihiro Kitahara, Tachikawa, Japan

[73] Assignee: Olympus Optical Co., Ltd., Tokyo, Japan

[21] Appl. No.: 692,494

[22] Filed: Aug. 6, 1996

[30] Foreign Application Priority Data

Aug. 9, 1995 [JP] Japan ................................ 7-203358

[51] Int. Cl.⁶ ........................................................ G06K 7/06
[52] U.S. Cl. ............................ 235/441; 235/479; 235/492
[58] Field of Search .................................. 235/441, 479, 235/492

[56] References Cited

U.S. PATENT DOCUMENTS

| | | | |
|---|---|---|---|
| 4,873,425 | 10/1989 | Langlais | 235/441 |
| 4,990,758 | 2/1991 | Shibano et al. | |
| 5,012,078 | 4/1991 | Pernet | 235/441 |
| 5,036,184 | 7/1991 | Sasaki | 235/479 |
| 5,130,521 | 7/1992 | Shino et al. | |
| 5,179,267 | 1/1993 | Hashimoto et al. | |
| 5,202,551 | 4/1993 | Parrer et al. | 235/441 |
| 5,360,969 | 11/1994 | Suzuki | 235/479 |
| 5,508,501 | 4/1996 | Fujimoto | 235/441 |

FOREIGN PATENT DOCUMENTS

| | | |
|---|---|---|
| 0 230 069 A1 | 7/1987 | European Pat. Off. . |
| 0 269 387 A1 | 6/1988 | European Pat. Off. . |
| 0 492 358 A1 | 7/1992 | European Pat. Off. . |
| 60-84686 | 5/1985 | Japan . |
| 61-103287 | 5/1986 | Japan . |
| 63-78798 | 4/1988 | Japan . |
| 64-76291 | 3/1989 | Japan . |
| 2-144686 | 6/1990 | Japan . |
| 5-67250 | 3/1993 | Japan . |
| 1 546 053 | 5/1979 | United Kingdom . |

*Primary Examiner*—Harold Pitts
*Attorney, Agent, or Firm*—Frishauf, Holtz, Goodman, Langer & Chick

[57] ABSTRACT

An information recording and reproducing apparatus comprising a mechanism for accepting a card recording medium having a plurality of recording sections includes at least one recording section including at least an IC chip. A recording/reproducing circuit performs at least one of a recording mode for recording information into the IC chip and a reproducing mode for reproducing the information from the IC chip, a transporting mechanism for transporting the recording medium to a first position in which the IC chip faces the recording/reproducing circuit, and a moving mechanism for, in order to bring the IC chip into contact or close to the recording/reproducing circuit, moving the recording medium transported to the first position by the transporting mechanism toward the recording/reproducing circuit to a second position in which the recording/reproducing circuit can perform at least one of the recording mode and the reproducing mode.

20 Claims, 7 Drawing Sheets

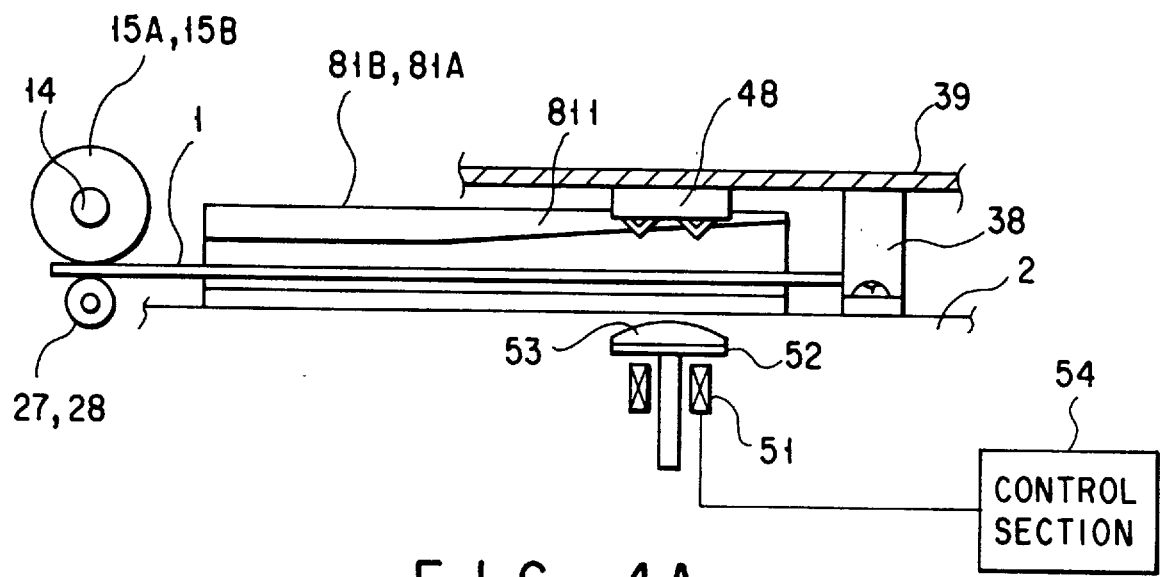
F I G. 4A
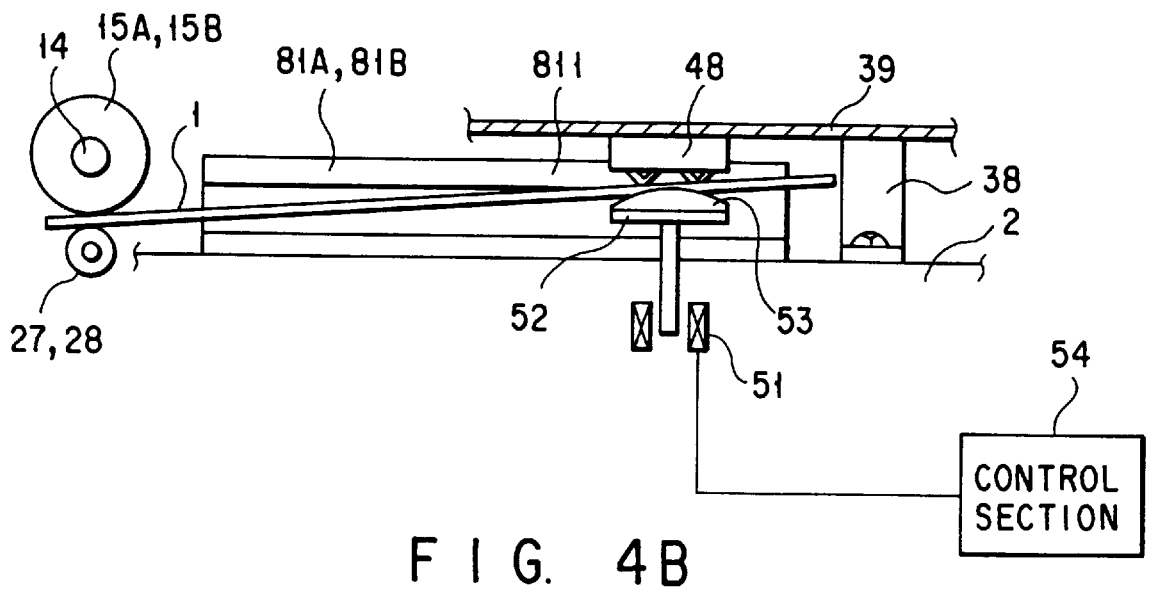
F I G. 4B

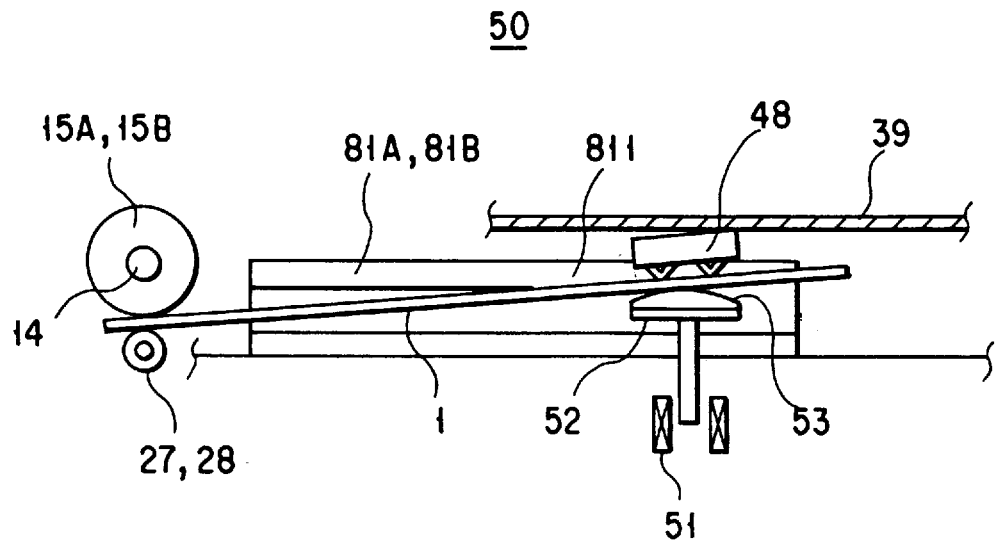
F I G. 7
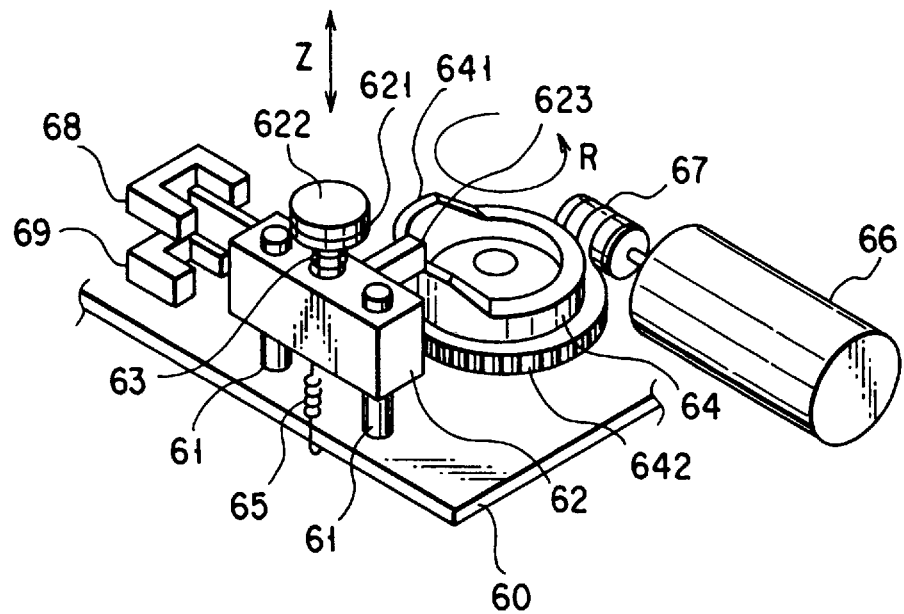
F I G. 8

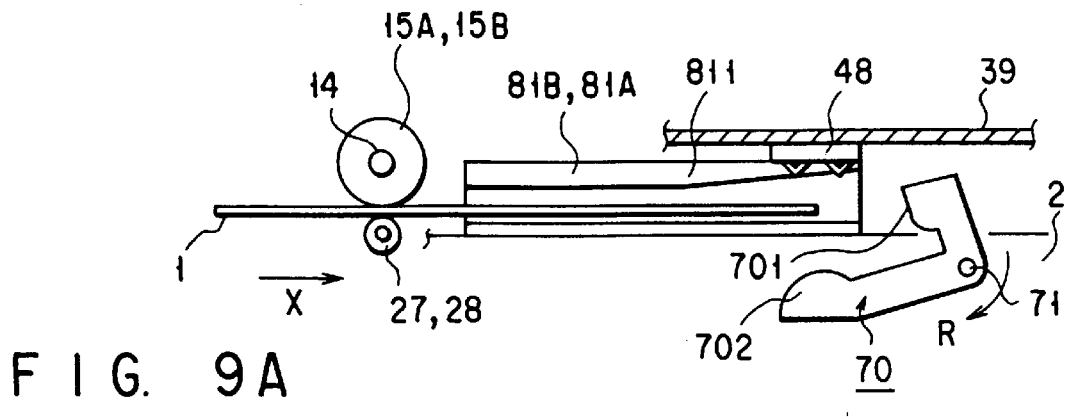
F I G. 9A
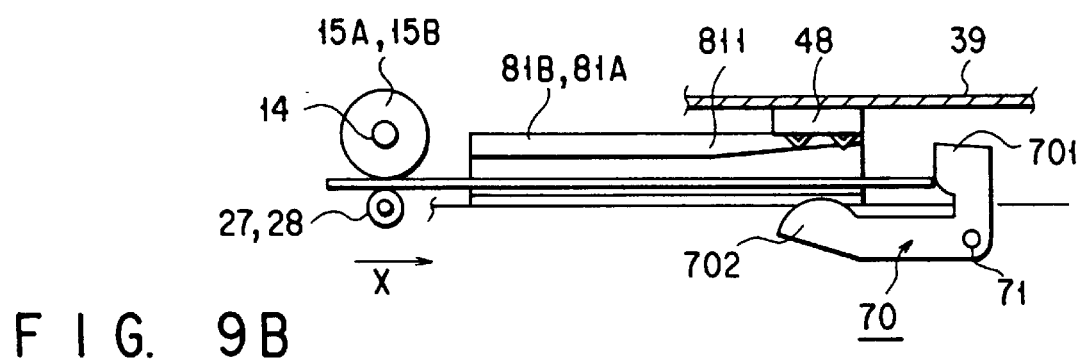
F I G. 9B
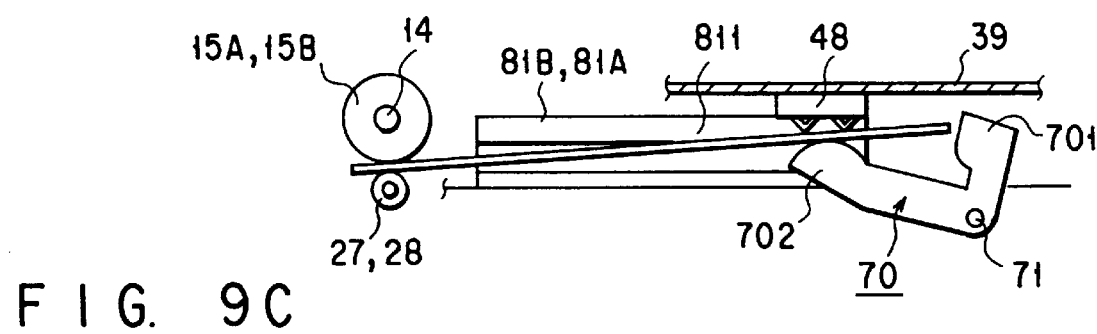
F I G. 9C
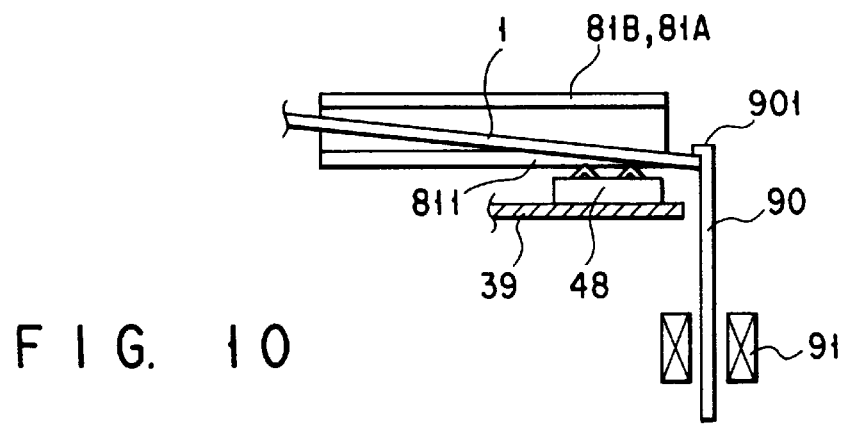
F I G. 10

INFORMATION RECORDING AND REPRODUCING APPARATUS

BACKGROUND OF THE INVENTION

1. Field of the Invention

This invention relates to an information recording and reproducing apparatus that at least one of records the information into a composite card (hereinafter, referred to as a hybrid card) having an IC chip and at least one of an optical recording area and a magnetic recording area on it and reproduces the information from the composite card.

2. Description of the Related Art

Card-like recording mediums have been available in the form of magnetic cards that record and reproduce the information using magnetic stripes, optical cards that record and reproduce the information optically using a laser beam, and IC cards that have IC chips embedded therein. These cards are all excellent in portability and have the following advantages and disadvantages.

For example, magnetic cards are produced at low cost and information can be read out from and written in the magnetic cards. They, however, cannot store a large volume of information because their memory capacity is as small as several bytes. Optical cards have a large memory capacity and can store as many pieces of information as several megabytes. The information stored in them, however, cannot be rewritten, so that their application is limited. IC cards enable high-speed access and have an advantage over the other types of cards in security because they help maintain the secrecy of the information easily, but cost high per unit memory capacity.

To make use of the features of these types of cards and compensate for the disadvantages, a hybrid card having an IC chip and at least one of an optical recording area and a magnetic recording area has been considered.

There have been hybrid cards of this type which have an optical recording area and an IC chip area on one side of the card. A recording and reproducing apparatus that records and reproduces the information into and from such a hybrid card has been disclosed in Jpn. Pat. Appln. KOKAI Publication No. 5-67250.

The recording and reproducing apparatus records and reproduces the information into and from the optical recording area on a card by scanning an optical head in a specific direction, the optical head being located above the optical recording area. A contact holder is pivotally provided so as to correspond to an IC chip area. To access the IC chip, part of the contact holder is pressed with the card end to rotate the contact holder, which consequently presses the contact against the contact section of the IC chip area, thereby enabling the recording and reproducing of the information into and from the IC chip.

With this configuration of rotating the contact holder, the wires drawn from the contact holder must be connected to the circuit board on which a CPU and others have been mounted. Since special wires using a flexible cable or the like are necessary for the wiring between the movable section (contact holder) and the fixed section (circuit board), this requires troublesome wiring work. The repeated rotary motion of the contact holder may disconnect the soldered portion of the wiring from the holder, causing the problem of degrading the reliability of the wiring.

Furthermore, since the contact holder handles a very small signal, noise might be introduced into the circuit at a wiring portion, such as the cable, existing between the contact holder and the circuit board, causing the problem of making unstable the contents of the information read from or written into the IC chip.

SUMMARY OF THE INVENTION

The object of the present invention is to provide a hybrid-card information recording and reproducing apparatus which not only facilitates wiring work but also assures a stable operation and which can be made more compact.

According to the present invention, there is provided an information recording and reproducing apparatus comprising: a mechanism for accepting a card recording medium having a plurality of recording sections including at least one recording section including at least an IC chip; a recording/reproducing circuit for performing at least one of a recording mode for recording information into the IC chip and a reproducing mode for reproducing the information from the IC chip; a transporting mechanism for transporting the recording medium to a first position in which the IC chip faces the recording/reproducing circuit; and a moving mechanism for, in order to bring the IC chip into contact or close to the recording/reproducing circuit, moving the recording medium transported to the first position by the transporting mechanism toward the recording/reproducing circuit to a second position in which the recording/reproducing circuit can perform at least one of the recording mode and the reproducing mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

FIG. 4A is a side view in partial cross-section of the information recording and reproducing apparatus to help explain the configuration of the card driving section;

FIG. 4B is a side view in partial cross-section of the information recording and reproducing apparatus to help explain the configuration of the card driving section;

FIG. 7 shows a modification of the configuration of the card driving section according to the embodiment;

FIG. 8 shows a modification of the configuration of the card driving section according to the embodiment;

FIG. 9A shows a modification of the configuration of the card driving section according to the embodiment;

FIG. 9B shows a modification of the configuration of the card driving section according to the embodiment;

FIG. 9C shows a modification of the configuration of the card driving section according to the embodiment; and FIG. 10 shows a modification of the configuration of the card driving section according to the embodiment.

DETAILED DESCRIPTION OF THE PREFERRED EMBODIMENTS

Figure 1:
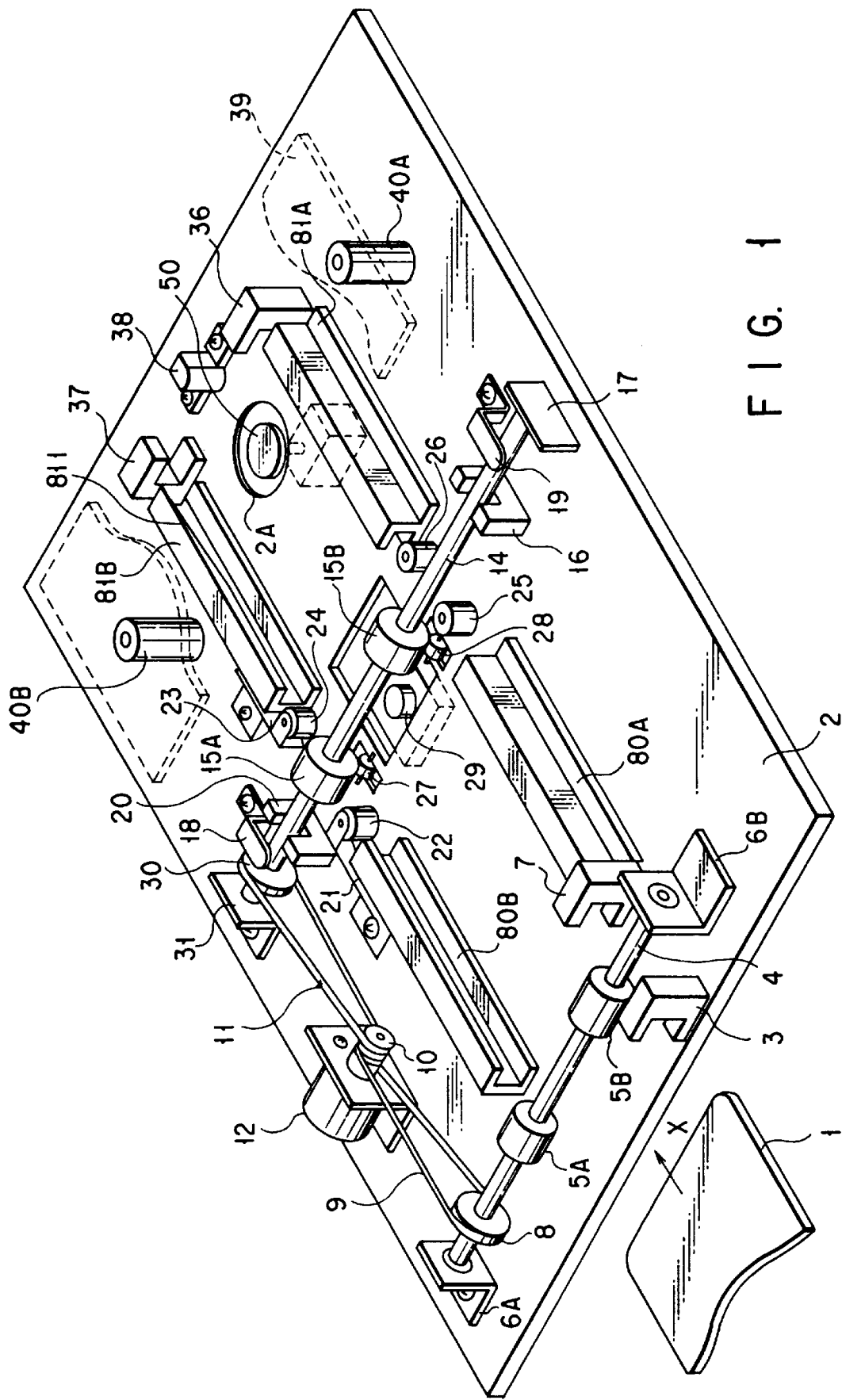
FIG. 1 shows the configuration of an information recording and reproducing apparatus according to an embodiment of the present invention.
Figure 2A:
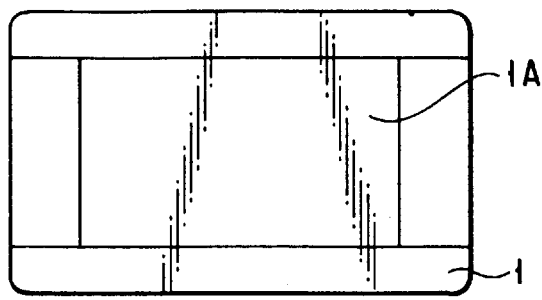
FIG. 2A is a view of the bottom surface of a hybrid card applied to the information recording and reproducing apparatus of the embodiment.
Figure 2B:
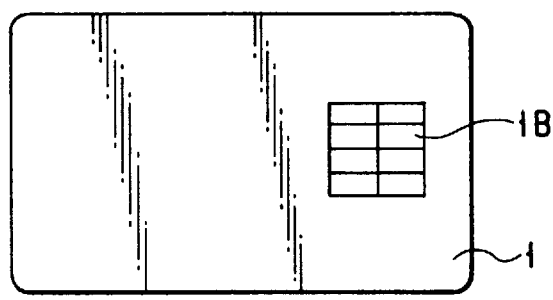
FIG. 2B is a view of the top surface of the hybrid card applied to the information recording and reproducing apparatus.

FIG. 1 shows the configuration of an information recording and reproducing apparatus according to an embodiment of the present invention. FIGS. 2A and 2B are views of a hybrid card 1 applied to the information recording and reproducing apparatus of FIG. 1. FIGS. 2A and 2B illustrate the bottom and top surfaces of the card. As shown in FIG. 2A, the hybrid card 1 has an optical recording area on almost the whole of the bottom surface, one surface of the card. Furthermore, as shown in FIG. 2B, the card has an IC chip 1B embedded in a place almost in the center of its width on the top surface, or the other surface, and close to one end of the card.

As shown in FIG. 1, the hybrid card 1 can be entered into a card slot (not shown) at one end of a frame 2 in the card-inserting direction indicated by arrow X, with the optical recording area 1A downward. The card slot is provided with a card sensor 3. The card sensor 3 has a "⊐"-shaped cross section and senses whether the hybrid card 1 has been inserted into the card slot.

A roller shaft 4 is positioned on the frame 2 in a direction perpendicular to the direction into which the hybrid card is inserted. The roller shaft 4 has both its ends supported by support members 6A and 6B in such a manner that the shaft rotates freely. The roller shaft 4 is provided with rubber rollers 5A and 5B to transport the hybrid card 1, the rollers 5A and 5B being separated by a specific distance shorter than the width of the hybrid card 1.

A portion near one end of the roller shaft 4 is connected to a motor 12 via a pulley 8, a belt 9, and a pulley 10. The power of the motor 12 is transmitted to the roller shaft 4 via the pulley 10, belt 9, and pulley 8. This enables the hybrid card 1 to be transported in the inserting direction or the discharging direction, depending on the direction in which the roller axis 4 rotates (clockwise or counterclockwise) according to the rotation of the motor 12.

On the frame 2, a roller shaft 14 is spaced a specific distance shorter than the longitudinal dimension of the hybrid card 1 apart from the roller shaft 4 so that the roller shaft 14 may be parallel with the roller shaft 4. One end of the roller shaft 14 is pressed against a reference member 17, with the shaft being urged by a spring 31 from the other end of the shaft toward the one end. Both ends of the roller shaft 14 are pressed downward by springs 18 and 19. Under the biasing force of these springs 18 and 19, the shaft is allowed to move upward and downward and is also supported so as to rotate freely.

The roller shaft 14 is provided with rubber rollers 15A and 15B to transport the hybrid card 1, the rollers 15A and 15B being separated by a specific distance shorter than the width of the hybrid card 1. Guides 16 and 20 are provided on the frame 2 to guide the roller shaft 14 in upward and downward movement.

A portion near one end of the roller shaft 14 is connected to the motor 12 via a pulley 30, a belt 11, and the pulley 10. The power of the motor 12 is transmitted to the roller shaft 14 via the pulley 10, belt 11, and pulley 30. This enables the hybrid card 1 to be transported in the inserting direction or the discharging direction, depending on the direction in which the roller axis 14 rotates (clockwise or counterclockwise) according to the rotation of the motor 12.

The frame 2 is also provided with reference rollers 27 and 28 so as to correspond to the rollers 15A and 15B. These reference rollers 27 and 28 pinch the hybrid card 1 with the rollers 15A and 15B and transport the card. This forces the hybrid card 1 to be subjected to a pressing force from the rollers 15A, 15B produced by a biasing force of the springs 18, 19.

On the frame 2, card guides 80A and 80B are separated by a specific distance equal to almost the width of the hybrid card 1 along the transportation path of the hybrid card 1 between the roller shaft 4 and the roller shaft 14. Each of the card guides 80A and 80B has a "⊐"-shaped cross section and not only guides the hybrid card 1 in transportation, with the longitudinal side edges of the hybrid card 1 being pressed against these guides, but also limits the vertical movement of the hybrid card 1.

Reference rollers 25 and 26 are provided on a prolonged line of the card guide 80A so as to sandwich the roller shaft 14 between them. These reference rollers 25, 26 project toward the hybrid card 1 a little more than the card guide 80A. Rollers 22 and 24 attached to springs 21 and 23 so as to rotate freely are provided so as to correspond to the reference rollers 25, 26. These rollers 22, 24 are pressed against the other longitudinal side edge of the hybrid card 1, thereby exerting a biasing force toward the reference rollers 25, 26.

On the other hand, card guides 81A and 81B are separated by a specific distance equal to almost the width of the hybrid card 1 on the prolonged lines of the card guides 80A and 80B along the transportation path on the opposite side of the roller shaft 14. Each of the card guides 81A and 81B has a "⊐"-shaped cross section. The card guides 81A, 81B not only guide the hybrid card 1 further transported by the rollers 15A, 15B on the roller shaft 14, with the longitudinal side edges of the hybrid card 1 being pressed against these guides, but also limit the vertical movement of the hybrid card 1.

Each of the card guides 81A, 81B is tapered so that the inside wall thickness of the top side 811 of the "⊐"-shaped cross section may get thinner gradually toward the far end of the guide with respect to the roller shaft 14 (the card guide 81A is not shown here). As the hybrid card 1 is moved along the top side 811, the card is moved upward.

On the frame 2, a sensor 7 is positioned near one end of the card guide 80A and a sensor 36 is positioned near the far end of the card guide 81A, with the roller shaft 14 being located between them. Each of these sensors 7, 36 has a "⊐"-shaped cross section. When the information is read from and written into the optical recording area 1A on the hybrid card 1 by an optical head 29 explained later, these sensors 7, 36 sense the end of the hybrid card 1 while the card is moving back and forth and limit the moving range of the hybrid card 1.

Furthermore, a sensor 37 is positioned near the far end of the card guide 81B with respect to the roller shaft 14. A stopper 38 is arranged in a place a little closer to the end of the frame 2 from the midpoint between the sensor 36 and sensor 37. When the information is read and written from and into the IC chip 1B of the hybrid card 1 through an IC terminal 48, which will be explained later, the stopper 38 is used to position the hybrid card 1. The stopper 38 is made of a resin (e.g., POM or PTFE) that has a good sliding characteristic to the hybrid card 1. The sensor 37 senses the state of the hybrid card 1 pressed against the stopper 38.

An optical head 29 is provided in a space under the frame 2 close to the roller shaft 14. The optical head 29 reads and writes the information from and into the optical recording area 1A of the hybrid card 1 transported as the roller shaft 14 rotates. Above the card guides 81A, 81B, a circuit board 39 is provided in parallel with the frame 2 surface via support pillars 40A and 40B.

Figure 3:
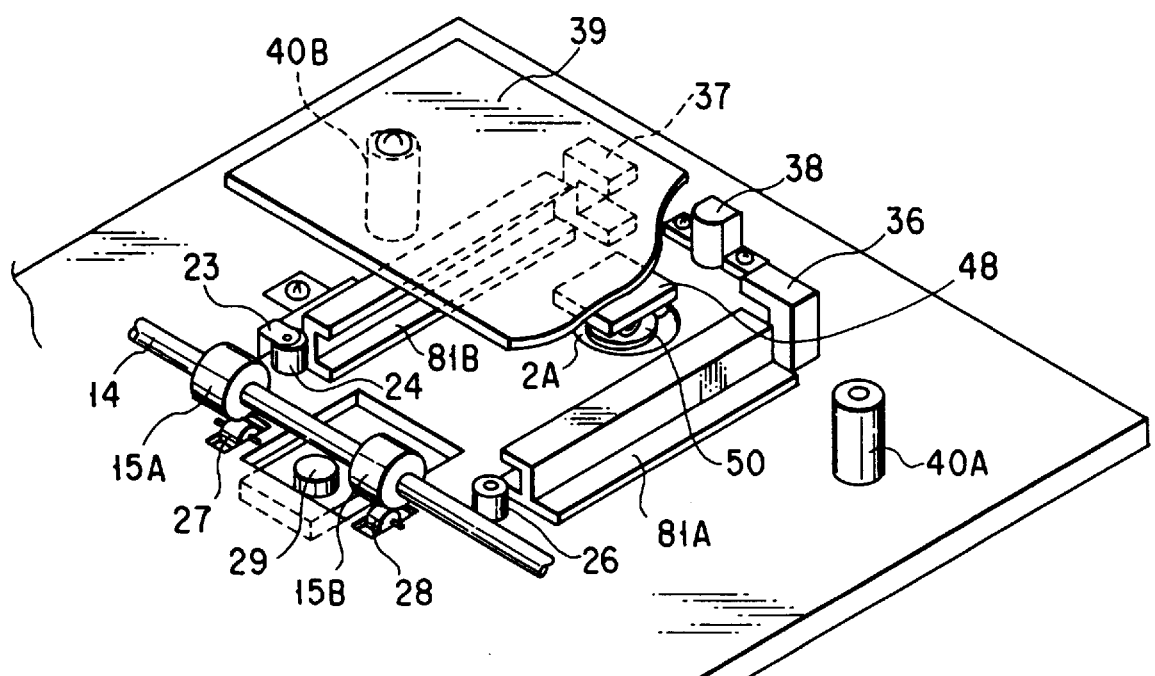
FIG. 3 shows the configuration of the important portion of the information recording and reproducing apparatus.

FIG. 3 shows the configuration of the important portion of the information recording and reproducing apparatus. In FIG. 3, the same parts as those in FIG. 1 are indicated by the same reference symbols. On the circuit board 39, not only at least a CPU and an IC terminal (not shown) constituting the control system of the apparatus are mounted, but also the IC terminal 48 that reads and writes the information from and into the IC chip 1B on the hybrid card 1 is provided directly via no cable. The IC terminal 48 is provided so as to face the IC chip 1B of the hybrid card 1 pressed against the stopper 38, with a small clearance being allowed between the terminal and the chip. IC terminal 48 is in contact with the IC chip 1B and performs at least one of input of a signal to be reproduced and output of a signal to be recorded.

Furthermore, a through hole 2A is made in a place facing the IC terminal 48 on the frame 2. In the through hole 2A, a card driving section 50 is provided. Like the optical head 29, the card driving section 50 is placed in the space under the frame 2.

FIG. 4A is a side view in partial cross-section of the information recording and reproducing apparatus to help explain the configuration of the card driving section 50. In FIG. 4A, the same parts as those in FIGS. 1 and 3 are indicated by the same reference symbols. As shown in FIG. 4A, the card driving section 50 comprises a solenoid 51, a lifter 52 driven upward and downward by the solenoid 51, a buffer rubber section 53, and a control section 54 for driving the solenoid 51.

When the control section 54 energizes the solenoid 51, the lifter 52 is moved, overcoming the biasing force of a spring (not shown), and projects upward from the surface of the frame 2. This pushes the hybrid card 1 upward, causing the IC chip 1B on the hybrid card 1 to come into contact with the IC terminal 48. The rubber section 53 is made of a material with a low hardness, such as EPDM or NBR, for example.

Figure 5:
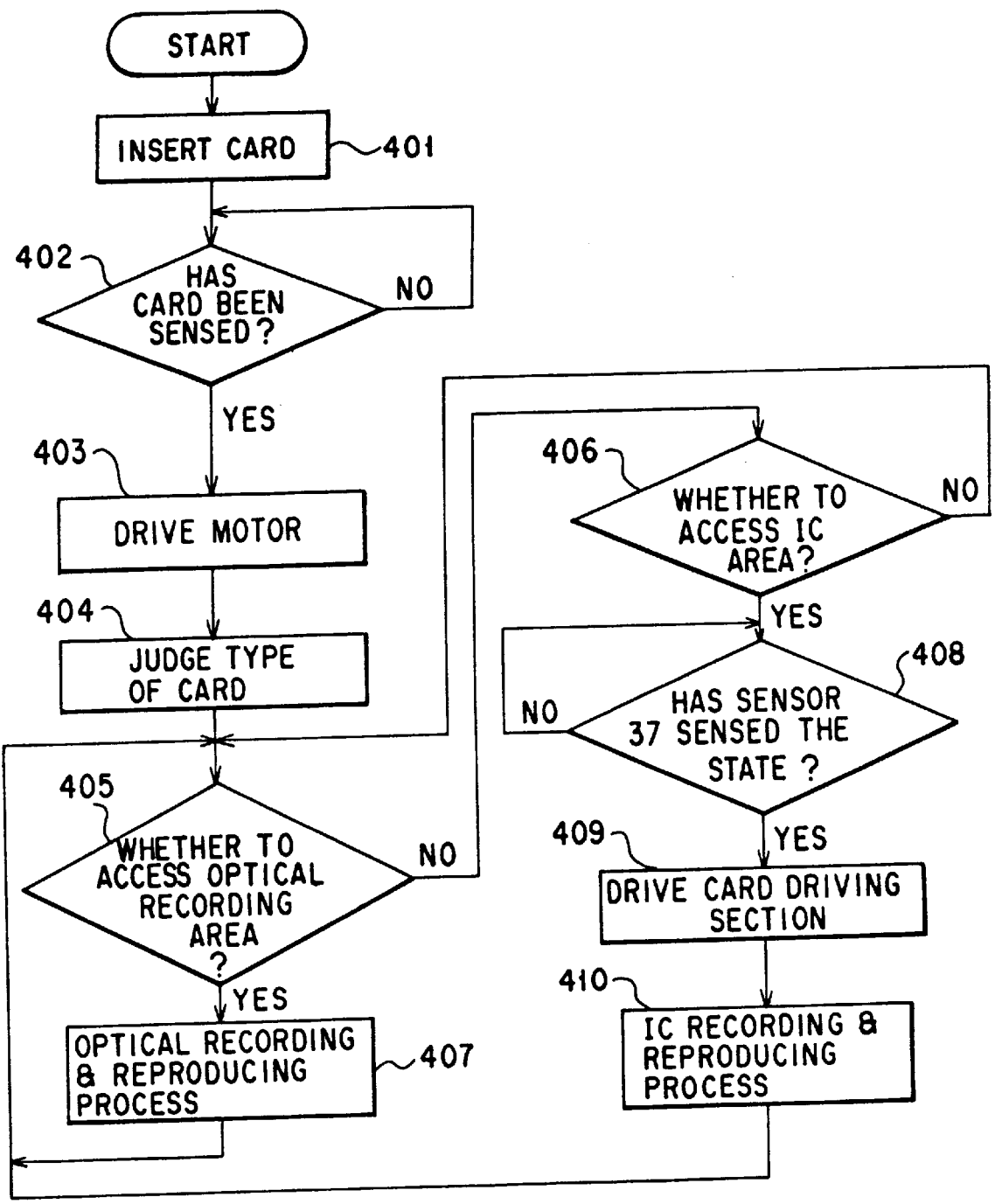
FIG. 5 is a flowchart for the operation procedure of the information recording and reproducing apparatus.

FIG. 5 is a flowchart showing the operation procedure for the information recording and reproducing apparatus constructed as described above. Hereinafter, the operation procedure for the information recording and reproducing apparatus will be described by reference to FIG. 5. First, at step 401, the hybrid card 1 is inserted into the card slot at one end of the frame 2 in the direction indicated by arrow X. At step 402, when the card sensor 3 has sensed that the hybrid card 1 has been inserted into the card slot, the control circuit (not shown), at step 403, drives the motor 12.

Then, the roller shaft 4 rotates clockwise via the pulley 10, belt 9, and pulley 8. As a result of the clockwise rotation, the rubber rollers 5A and 5B rotate clockwise. This causes the hybrid card 1 to be transported from the roller shaft 4 toward the roller shaft 14. At this time, the hybrid card 1 is transported, with the longitudinal side edge being pressed against the reference roller 25 by the biasing force of the roller 22. The leading edge of the hybrid card 1 then reaches the roller shaft 14.

Figure 6A:
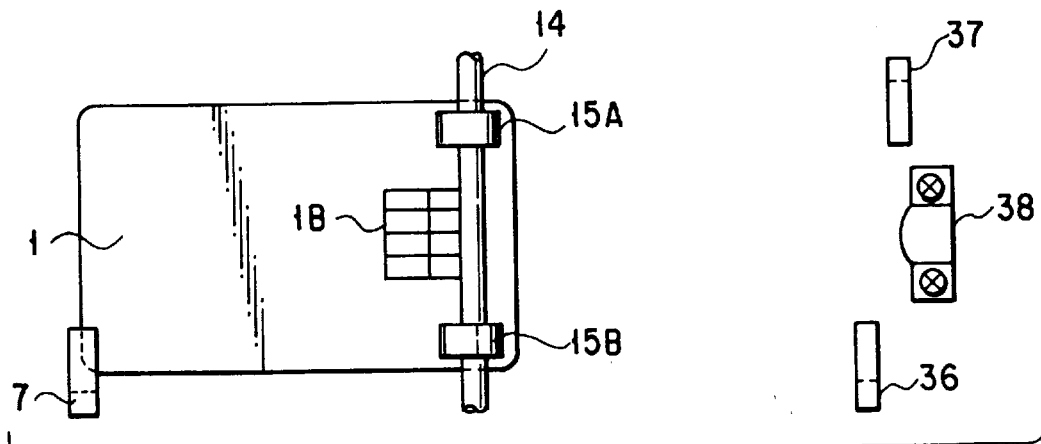
FIG. 6A illustrates the process of a hybrid card associated with the embodiment arriving at a stopper via a roller shaft.
Figure 6B:
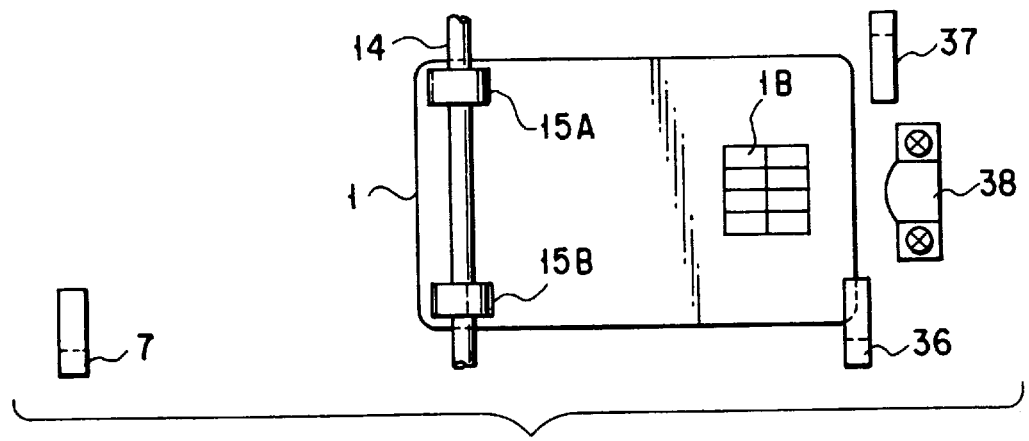
FIG. 6B illustrates the process of the hybrid card arriving at the stopper via the roller shaft.
Figure 6C:
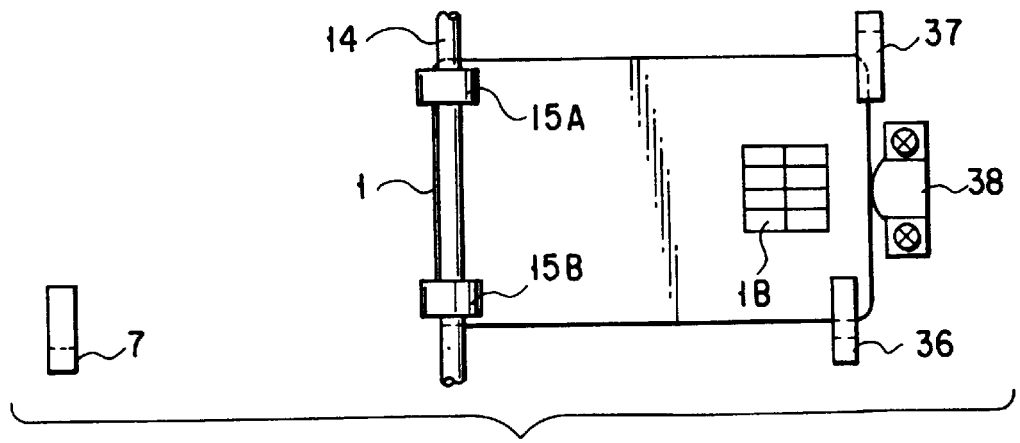
FIG. 6C illustrates the process of the hybrid card arriving at the stopper via the roller shaft.

FIGS. 6A, 6B, and 6C illustrate the steps of the hybrid card 1 passing through the roller shaft 14 and reaching the stopper 38. In FIGS. 6A, 6B, and 6C, the same parts as those in FIGS. 1, 2, and 3 are indicated by the same reference symbols.

FIG. 6A shows a state in which the leading edge of the hybrid card 1 has reached the roller shaft 14. In the state of FIG. 6A, the roller shaft 14 further rotates clockwise via the pulley 10, belt 11, and pulley 30. The clockwise rotation of the rollers 15A, 15B as a result of the clockwise rotation of the roller shaft 14 causes the hybrid card 1 to be transported further toward the sensor 36 until the leading edge of the hybrid card 1 has reached the sensor 36 as shown in FIG. 6B. At this time, the hybrid card 1 is transported, with the longitudinal side edge being pressed against the reference roller 26 by the biasing force of the roller 24.

During the transportation of the hybrid card 1, the type of the hybrid card 1 is judged at step 404. During the time until the leading edge of the hybrid card 1 has reached the sensor 36, the judgment is made at the control circuit on the basis of the recognition result of the card type information read from the optical recording area 1A by the optical head 29.

Specifically, when it is judged on the basis of the read signal from the optical recording area 1A that the card has only the optical recording area 1A, it is determined to be an optical card. When it is judged that the card has the optical recording area 1A and the IC chip 1B, the card is determined to be a hybrid card. In the present embodiment, the card 1 has both of the optical recording area 1A and the IC chip 1B and therefore, is determined to be a hybrid card.

At step 405, the control circuit judges whether to access the optical recording area 1A. If the judgment result is NO, control will proceed to step 406, where it will be judged whether to access the IC chip 1B. If the judgment result is NO, control will return to step 405, where the control circuit waits in this state until an instruction to access the optical recording area 1A or IC chip 1B has been received. Thereafter, at step 405, when the control circuit recognizes an access instruction to the optical recording area 1A, it executes an optical recording process or an optical reproducing process according to the access instruction.

At this time, when the motor 12 rotates clockwise in the state of FIG. 6A, the roller shaft 14 rotates clockwise via the pulley 10, belt 11, and pulley 30, causing the hybrid card 1 to be transported until its leading edge has reached the sensor 36, with the hybrid card 1 being pinched between the rubber rollers 15A, 15B and the reference rollers 27, 28. At this time, the hybrid card 1 is transported, with the longitudinal side edge being pressed against the reference rollers 25 and 26 by the biasing force of the rollers 22 and 24.

After the leading edge of the hybrid card 1 has arrived at the sensor 36 as shown in FIG. 6B, the motor 12 rotates counterclockwise. The counterclockwise rotation causes the roller shaft 14 to rotate counterclockwise, forcing the hybrid card 1 to be transported toward the roller shaft 4 until the trailing edge of the hybrid card 1 has arrived at the sensor 7 as shown in FIG. 6A, with the card being pinched between the rubber rollers 15A, 15B and the reference rollers 27, 28.

After the trailing edge of the hybrid card 1 has reached the sensor 7, the motor 12 rotates clockwise again. This clockwise rotation causes the roller shaft 14 to rotate clockwise, transporting the hybrid card 1 toward the sensor 36, with the card being pinched between the rubber rollers 15A, 15B and the reference rollers 27, 28. From this time on, such a reciprocating transportation of the hybrid card 1 is repeated, enabling the optical head 29 to record the information into the optical recording area 1A on the hybrid card 1 or to reproduce the information from the optical recording area 1A.

When the hybrid card 1 is transported back and forth, the leading edge of the hybrid card 1 passes near the IC terminal 48 mounted on the circuit board 39. As shown in FIG. 4A, however, the solenoid 51 has not been energized in the card driving section 50, so that the lifter 52 has not projected upward from the surface of the frame 2. This leaves a small clearance between the IC terminal 48 on the circuit board 39 and the IC chip 1B on the hybrid card 1, preventing the IC terminal 48 from being an obstacle in transporting the hybrid card 1. After the recording of the information into the optical recording area 1A on the hybrid card 1 or the reproducing of the information from the optical recording area 1A has been completed, control returns to step 405.

After control has returned to step 405, the processing loop at step 405 and step 406 is repeated in a wait state until an instruction to access the optical recording area 1A or IC chip 1B has been received. Thereafter, when an access instruction to the optical recording area 1A has been received again, control goes to step 407, in which the optical head 29 records the information into the optical recording area 1A on the hybrid card 1 or reproduces the information from the optical recording area 1A as described above. On the other hand, when an access instruction to the IC chip 1B has been received, the recording/reproducing of the information into and from the IC chip 1B is executed at step 410.

At this time, when the motor 12 rotates clockwise in the state of FIG. 6A, the roller shaft 14 rotates clockwise via the pulley 10, belt 11, and pulley 30, causing the hybrid card 1 to be transported until its leading edge has reached the stopper 38, with the hybrid card 1 being pinched between the rubber rollers 15A, 15B and the reference rollers 27, 28. At this time, the hybrid card 1 is transported, with the longitudinal side edge being pressed against the reference rollers 25 and 26 by the biasing force of the rollers 22 and 24.

After the leading edge of the hybrid card 1 has been pressed against the stopper 38 as shown in FIG. 6C, and at step 408, the sensor 37 has sensed this state, the card driving section 50 is operated at step 409. At this time, the control section 54 energizes the solenoid 51.

Then, as shown in FIG. 4B, the solenoid 51 causes the lifter 52 to move upward, overcoming the biasing force of a spring (not shown), and project upward from the surface of the frame 2, pushing the hybrid card 1 upward via the rubber section 53. This forces the hybrid card 1 to be lifted with the reference rollers 27, 28 as a fulcrum, causing the IC chip 1B to come into contact with the IC terminal 48.

Since the card guides 81A, 81B are tapered in such a manner that the inside wall thickness of the upper side 811 gets thicker gradually, the rotating action is continued smoothly using the reference rollers 27, 28 as a fulcrum until the surface of the hybrid card 1 has become almost parallel to the upper sides of the card guides 81A, 81B.

Since the hybrid card 1 is lifted using the reference rollers 27, 28 as a fulcrum, a pressing force might be applied diagonally to the IC terminal 48 on the circuit board 39 against which the IC chip 1B is pressed, making the amount of force differ terminal by terminal.

FIG. 7 is a side view in partial cross section of the information recording and reproducing apparatus to help explain a modification of the configuration of the card driving section 50. FIG. 7 shows a modification of the installation of the IC terminal 48. In FIG. 7, the same parts as those in FIGS. 4A and 4B are indicated by the same reference symbols. As shown in FIG. 7, the IC terminal 48 is provided on the circuit board 39 in an inclined position so that the IC terminal 48 may be in parallel and in contact with the hybrid card 1, thereby uniforming the amount of force exerted on each terminal of the IC terminal 48 and therefore helping stabilize the exchange of the signals at this section.

Then, at step 410, the recording of the information into the IC chip 1B on the hybrid card 1 via the IC terminal 48 or the reproducing of the information from the IC chip 1B is executed. After the recording of the information into the IC chip 1B on the hybrid card 1 via the IC terminal 48 or the reproducing of the information from the IC chip 1B has been completed, control returns to step 405.

After control has returned to step 405, the processing loop at step 405 and step 406 is repeated in a wait state until an instruction to access the optical recording area 1A or IC chip 1B has been received. Thereafter, when an access instruction to the IC chip 1B has been received again, control goes to step 408, in which the recording of the information into the IC chip 1B or the reproducing of the information from the IC chip 1B is executed as described above.

In the above modification, when an access instruction to the IC chip 1B has been received, the hybrid card 1 is transported until its leading edge has reached the stopper 38 as shown in FIG. 6C and in this state, the card driving section 50 is operated to lift the hybrid card 1, thereby bringing the IC chip 1B into contact with the IC terminal 48. As shown in FIG. 6B, however, with the leading edge of the hybrid card 1 arriving at the sensor 36, the operation of an access instruction to the IC chip 1B may be executed. This eliminates the installation of the sensor 37 and stopper 38, helping minimize the transportation area of the hybrid card 1.

FIG. 8 is a perspective view of a modification of the configuration of the card driving section that pushes up the hybrid card 1 to bring the IC chip 1B into contact with the IC terminal 48. As shown in FIG. 8, on a base 60, pins 61, 61 are provided so as to be perpendicular to the base 60. Furthermore, there is also provided a support member 62 that is movable in the direction indicated by arrow Z using the pins 61, 61 as a guide in the vertical direction. The support member 62 is provided with a lifter 621 having a rubber section 622 as described earlier.

The support member 62 is always biased downward by a spring 65. A compression spring 63 intervenes between the lifter 621 and the support member 62. The compression spring 63 functions as a buffer for alleviating the magnitude of force greater than a specific value exerted on the lifer 621, preventing the load greater than is necessary from being exerted on the hybrid card 1.

Furthermore, an arm section 623 integrally formed with the support member 62 projects from the support member 62. The arm section 623 is engaged with a cam 64. The cam 64 is provided with a tall wall section 641 at a part of its periphery. The cam 64 is provided integrally with a gear 642. The power of a gear 67 provided on the output shaft of a motor 66 rotates the cam 64 in the direction of arrow R, causing the tall wall section 641 to lift the support member 62 via the arm section 623.

Furthermore, the lifter 621 is forced to project from the surface of the frame 2, thereby pushing up the card 1 via the rubber section 622. A sensor 68 senses the upper dead point in the vertical direction of the support member 62 and a sensor 69 senses the lower dead point in the vertical direction. With this configuration, too, the hybrid card 1 is raised by the lifter 621, thereby bringing the IC chip 1B into contact with the IC terminal 48 reliably.

FIGS. 9A, 9B, and 9C are side views in partial cross section of the information recording and reproducing apparatus to help explain a modification of the configuration of the card driving section. In FIGS. 9A, 9B, and 9C, the same parts as those in FIGS. 4A and 4B are indicated by the same reference symbols.

While, in the above embodiment, the hybrid card 1 is lifted by using the magnetic parts, in the present modification, a lifter 70 that rotates around a fulcrum 71 is made to rotate by the transportation of the hybrid card 1, thereby lifting the hybrid card 1. The lifter 70 is in the form of an L shape, with the bent portion being supported at the fulcrum 71 provided below the surface of the frame 2. When the end of the hybrid card 1 being transported pushes one end of the lifter 70, acting as an actuating section 701, the lifter 70 rotates around the fulcrum 71, causing the other end of the lifter, acting as a pressing section 702, to lift the hybrid card 1.

Specifically, as shown in FIG. 9A, when the hybrid card 1 is transported in the direction of arrow X and pushes the actuating section 701 of the lifter 70, the lifter 70 rotates around the fulcrum 71 in the direction of arrow R. Then, as shown in FIG. 9B, the pressing section 702 of the lifter 70 comes into contact with the bottom surface of the hybrid card 1. Furthermore, as shown in FIG. 9C, when the hybrid card 1 is transported in the direction of arrow X, the lifter 70 rotates further and consequently the pressing section 702 pushes up the hybrid card 1, bringing the IC chip 1B into contact with the IC terminal 48.

With this configuration, too, the hybrid card 1 is raised by the lifter 70, bringing the IC chip 1B into contact with the IC terminal 48 reliably. In the modification, with the IC terminal 48 above the hybrid card 1, the hybrid card 1 is lifted by the card driving section, thereby bringing the IC chip 1B on the hybrid card 1 into contact with the IC terminal 48. Depending on the configuration of an information recording and reproducing apparatus, the IC terminal 48 can be considered to be located below the hybrid card 1.

FIG. 10 is a side view in partial cross section of the information recording and reproducing apparatus to help explain a modification of the configuration of the card driving section. In FIG. 10, the same parts as those in FIGS. 4A and 4B are indicated by the same reference symbols. Unlike the hybrid card 1 in the above embodiment, a hybrid card 1 in this modification has an optical recording area 1A almost all over the top surface. It also has an IC chip 1B embedded in a place close to one end of the bottom surface of the card and almost in the mid-point across the width of the card.

As shown in FIG. 10, a lifter 90 having a hook section 901 is provided so as to move upward and downward by means of a solenoid 91. When the hybrid card 1 is transported to a specific position to record or reproduce the information into or from the IC chip 1B, the lifter 90 is moved downward by the solenoid 91. This makes the hook section 901 of the lifter 90 normally in the upper position move downward, hooking the end of the hybrid card 1 and pulling it downward, with the result that the IC chip 1B on the bottom surface of the hybrid card 1 is pressed against the IC terminal 48.

In the above embodiment, the hybrid card 1 has the optical recording area 1A and IC chip 1B. In the case of an optical card having only the optical recording area 1A, only the optical recording/reproducing process at step 407 is executed. When an IC card having only the IC chip 1B is used, the IC recording/reproducing process at step 410 is executed. While in the above embodiment, the hybrid card 1 having the optical recording area 1A and IC chip 1B has been explained, the information recording and reproducing apparatus may be applied to a hybrid card combining a magnetic recording area and an IC chip. In this case, a magnetic head is provided in place of the optical head 29 shown in FIGS. 1 and 3.

While in the above embodiment, the IC chip 1B on the hybrid card 1 is brought into contact with the IC terminal 48, another known information recording and reproducing apparatus can be utilized which at least one of records and reproduces the information by means of light or electromagnetic wave, with the IC chip being in noncontact with the IC terminal. In this case, the IC terminal 48 and the circuit board 39 are provided, taking into account a specific distance being allowed between the hybrid card 1 and the IC terminal when the hybrid card 1 is in a lifted position. Specifically, the IC terminal 48 and circuit board 39 are provided the specific distance above the positions shown in FIGS. 4A and 4B. This prevents the IC chip 1B from coming into contact with the IC terminal 48 when the hybrid card 1 is lifted.

In the above case, a sensor for sensing the distance through which the hybrid card 1 is lifted may be provided and from the sensing result of the sensor, the distance between the hybrid card 1 and the IC terminal 48 be sensed. When the sensed distance has reached the specific distance, the control section 54 controls the solenoid 51 to stop the lifter 52 from moving upward. Furthermore, the sensor may sense the specific distance directly. In the case of FIGS. 9A, 9B, and 9C, the shape of the lifter 70 is designed to provide the specific distance between the hybrid card 1 and the IC terminal 48 when the lifter 70 stops rotating.

With the information recording and reproducing apparatus, the transporting mechanism drives the hybrid card 1 toward the IC terminal 48, with the IC chip 1B on the hybrid card 1 corresponding to the IC terminal 48, and brings the IC chip 1B into contact with the IC terminal 48. This enables the IC chip 1B on the hybrid card 1 to come into contact with the IC terminal 48, with the IC terminal 48 remaining fixed. This not only facilitates wiring work for the IC terminal 48 but also helps realize highly reliable wiring.

Since the driving mechanism (including the lifter 52, solenoid 51, and control section 54) is placed in the same space that houses the optical head 29, a space in which the driving mechanism is to be housed can be secured effectively. This helps minimize the height of the information recording and reproducing apparatus, making the apparatus thinner.

Since the IC terminal 48 is mounted directly on the circuit board provided with a CPU constituting the control circuit that processes at least a signal inputted into the IC chip 1B and a signal outputted from the IC chip 1B, there is no possibility that noise will be introduced into a very small signal dealt with the IC terminal 48, assuring a stable operation all the time.

Furthermore, the driving mechanism makes a rotary motion using part of the mechanism as a fulcrum, an unnecessary bending force is not exerted on the hybrid card 1, preventing the recording section of the hybrid card 1 from being damaged.

The transporting mechanism has the card guides 81A, 81B that guide the hybrid card 1 in movement so as to bring the IC chip 1B on the hybrid card 1 into parallel with the surface of the top side 811, with the IC chip 1B on the hybrid card 1 being in contact with the IC terminal 48. This enables the hybrid card 1 to be driven smoothly.

Furthermore, because the IC chip 1B is made almost parallel with the IC terminal 48, with the IC chip 1B on the hybrid card 1 being in contact with the IC terminal 48, the magnitude of force exerted on the IC terminal 48 can be made uniform, enabling the signal to be exchanged stably.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information recording/reproducing apparatus comprising:
    a receiving section for receiving a card recording medium having a plurality of recording sections including at least one recording section having at least one IC chip;
    a first recorder/reproducer for transmitting at least one of a recording signal of information into said IC chip and a reproducing signal of information from said IC chip, when said recorder/reproducer is in contact with or close to said IC chip;
    a transporting mechanism for transporting said recording medium to a first position in which said IC chip faces said recorder/reproducer with a distance therebetween; and
    a moving mechanism for, in order to bring said IC chip into contact or close to said recorder/reproducer, starting to move said recording medium transported to said first position by said transporting mechanism toward said recorder/reproducer to a second position in which said recorder/reproducer can perform at least one of the recording and the reproducing, when said recording medium is taken in said receiving section and a first access instruction to said IC chip is received.

2. An information recording/reproducing apparatus according to claim 1, wherein said moving mechanism comprises a movable contact section that comes into contact with said recording medium and driving mechanism for driving said movable contact section.

3. An information recording/reproducing apparatus according to claim 2, further comprising a second recorder/reproducer for at least one recording the information into a remaining one of the plurality of recording sections other than the recording section having said IC chip and reproducing said information.

4. An information recording/reproducing apparatus according to claim 3, wherein said second recorder/reproducer is arranged opposite to said first recorder/reproducer with respect to said recording medium.

5. An information recording/reproducing apparatus according to claim 4, wherein said movable contact section and said driving mechanism are arranged in the same space as a space that houses said second recorder/reproducer.

6. An information recording/reproducing apparatus according to claim 5, further comprising a circuit board provided with a CPU including a control circuit that processes at least a signal inputted to said IC chip and a signal outputted from said IC chip, wherein said first recorder/reproducer is provided directly on said circuit board.

7. An information recording/reproducing apparatus according to claim 6, wherein said driving mechanism turns said recording medium, with one end of said recording medium as a fulcrum.

8. An information recording/reproducing apparatus according to claim 7, wherein said transporting mechanism has a guide member that guides said recording medium in transportation, said guide member being almost parallel to said recording medium when said IC chip on said recording medium is in contact with said recorder/reproducer.

9. An information recording/reproducing apparatus according to claim 8, wherein said first recorder/reproducer is almost parallel to said IC chip when said IC chip on said recording medium is in contact with said first recorder/reproducer.

10. An information recording/reproducing apparatus according to claim 3, wherein said movable contact section and said driving mechanism are arranged in the same space as a space that houses said second recorder/reproducer.

11. An information recording/reproducing apparatus according to claim 1, further comprising a second recorder/reproducer for at least one of recording the information into a remaining one of the plurality of recording sections other than the recording section having said IC chip and reproducing said information.

12. An information recording/reproducing apparatus according to claim 11, wherein said second recorder/reproducer is arranged opposite to said first recorder/reproducer with respect to said recording medium.

13. An information recording/reproducing apparatus according to claim 1, further comprising a circuit board provided with a CPU including a control circuit that processes at least a signal inputted to said IC chip and a signal outputted from said IC chip, wherein said first recorder/reproducer is provided directly on said circuit board.

14. An information recording/reproducing apparatus according to claim 2, wherein said driving mechanism turns said recording medium, with one end of said recording medium as a fulcrum.

15. An information recording/reproducing apparatus according to claim 1, wherein said transporting mechanism has a guide member that guides said recording medium in transportation, said guide member being almost parallel to said recording medium when said IC chip on said recording medium is in contact with said recorder/reproducer.

16. An information recording/reproducing apparatus according to claim 15, wherein said first recorder/reproducer is almost parallel to said IC chip when said IC chip on said recording medium is in contact with said first recorder/reproducer.

17. An information recording/reproducing apparatus according to claim 1, wherein said first recorder/reproducer is almost parallel to said IC chip when said IC chip on said recording medium is in contact with said first recorder/reproducer.

18. An information recording/reproducing apparatus according to claim 1, wherein said first recorder/reproducer has an IC terminal which is in contact with the IC chip and performs at least one of input of a signal to be reproduced by said first recorder/reproducer and output of a signal to be recorded by said first recorder/reproducer.

19. An information recording/reproducing apparatus according to claim 1, further comprising:
    a position detector for detecting that said recording medium is transported to said first position in which said IC chip faces said recorder/reproducer with said distance therebetween; and wherein when said recording medium is not detected by said position detector at said first position, said moving mechanism is not driven.

20. An information recording/reproducing apparatus comprising:

a receiving section for receiving a card recording medium having at least one IC chip and one optical recording section;

an optical recorder/reproducer for performing at least one of a recording mode for recording information into said optical recording section and a reproducing mode for reproducing information from said optical recording section;

an IC recorder/reproducer for transmitting at least one of a recording signal of information into said IC chip and a reproducing signal of information from said IC chip, when said IC recorder/reproducer is in contact with or close to said IC chip;

a transporting mechanism for transporting said recording medium to a first position in which said IC chip faces said IC recorder/reproducer with a distance therebetween; and a moving mechanism for, in order to bring said IC chip into contact or close to said IC recorder/reproducer, moving said recording medium transported to said first position by said transporting mechanism toward said IC recorder/reproducer to a second position in which said IC recorder/reproducer can perform at least one of the recording and the reproducing, when no access instruction to said optical recording section is received and an access instruction to said IC chip is received.

* * * * *